United States Patent [19]
Bahnsen

[11] 3,810,209
[45] May 7, 1974

[54] CAMERA POSITIONING APPARATUS

[76] Inventor: Gerhard I. W. Bahnsen, Box 1297, South Lake Tahoe, Calif. 95705

[22] Filed: Oct. 30, 1972

[21] Appl. No.: 302,047

[30] Foreign Application Priority Data
Oct. 21, 1971  Japan.............................. 46-83483

[52] U.S. Cl.......................... 95/86, 95/11, 355/25, 355/61
[51] Int. Cl. ........................................ G03b 17/56
[58] Field of Search ............. 95/11, 86; 355/25, 61, 355/62

[56] References Cited
UNITED STATES PATENTS
2,612,824  10/1952  Kroemmelbein....................... 95/11
2,282,768  5/1942  Pickett.................................. 355/25
1,837,704  12/1931  Dean..................................... 355/25
1,453,843  5/1923  Johnston.............................. 355/62

Primary Examiner—John M. Horan
Attorney, Agent, or Firm—William P. Green

[57] ABSTRACT

Apparatus including a camera preferably having a fixed focus lens adapted to be directed toward an object to be photographed, with the camera carrying a structure which projects generally toward the object and mounts a focus indicator for indicating to a user the location of a predetermined plane in which a photographic object may be positioned for proper focusing of its image on the camera film. A positioning unit projects beyond the focus indicator for engagement with a support, and is adjustable to vary the spacing of the focus indicator from the support.

8 Claims, 6 Drawing Figures

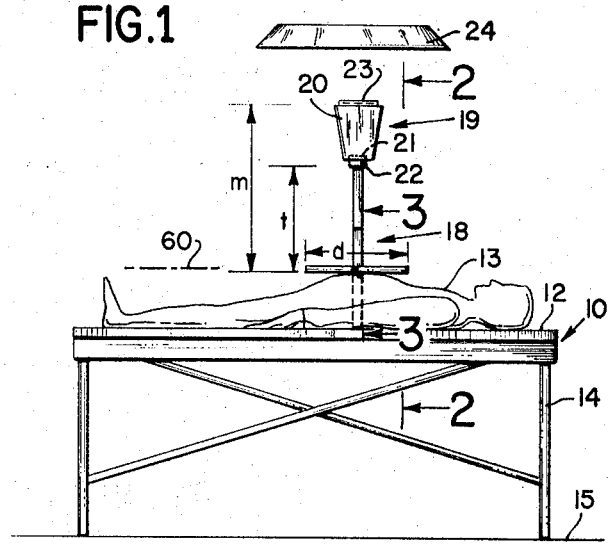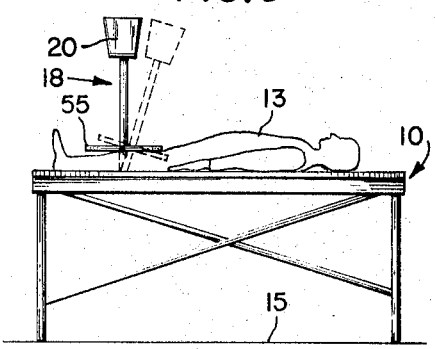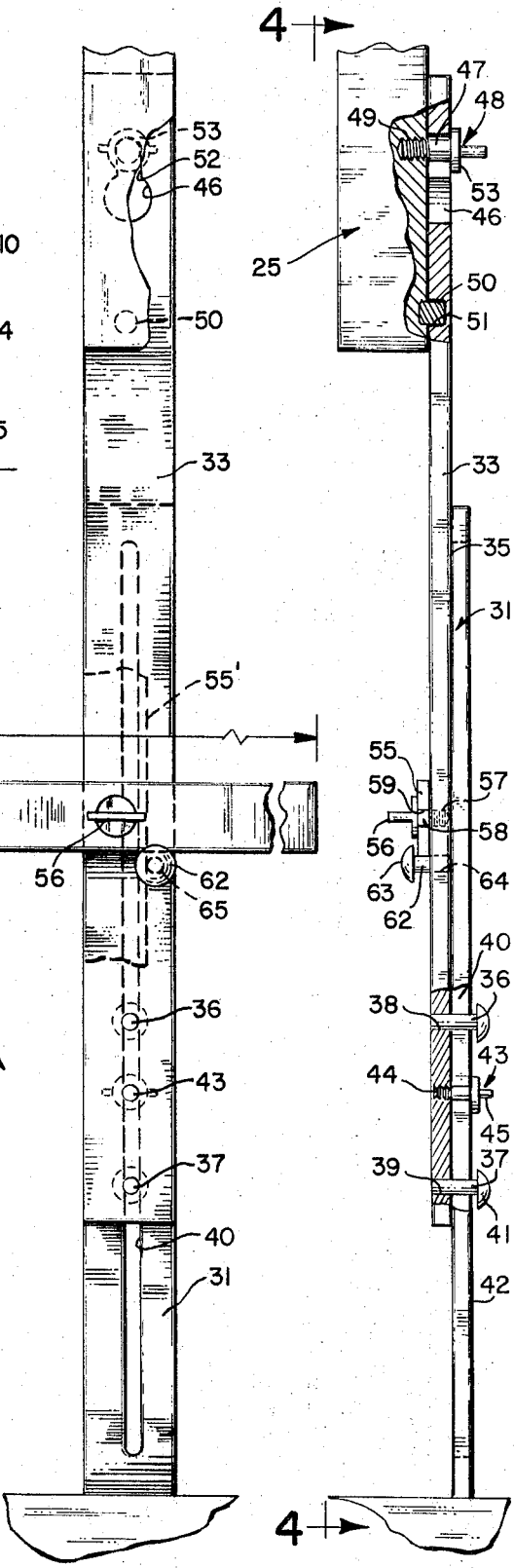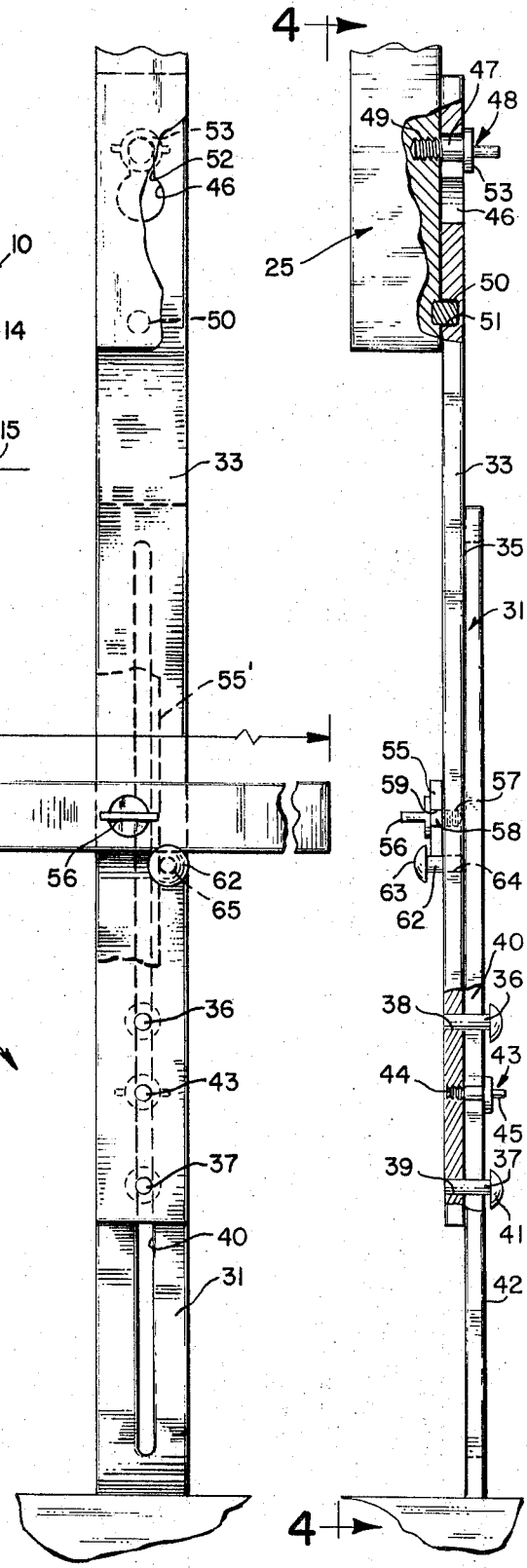

CAMERA POSITIONING APPARATUS

BACKGROUND OF THE INVENTION

This invention relates to improved apparatus for indicating the proper positioning of a camera relative to an object to be photographed. The apparatus is in certain respects especially useful for the taking of medical photographs, as, for instance, for photographing portions of a patient's body on an operating table, examination table, or treatment table.

During surgical operations, it is frequently desirable, if possible, to photograph the patient's body at different stages in the operating procedure. However, the taking of a picture with conventional equipment may interfere unduly with the activities of the doctors and nurses who are performing the operation, and such interference of course cannot be tolerated. The operation normally cannot safely be delayed to allow for the placement of a conventional tripod, or other camera mounting equipment, or for the focusing and adjustment of a conventional camera; and in addition most such conventional equipment could not easily be used without adversely affecting the sterile conditions in the operating room.

SUMMARY OF THE INVENTION

The present invention provides improved camera equipment which is particularly useful for photographing a patient on an operating table or the like, and which apparatus is so designed as to inherently avoid substantial interference with the opeating procedure, and to permit the taking of a series of pictures of the patient in an extremely simple manner by persons who may be virtually untrained in photography, but with completely and reliably predictable photographic results. The camera equipment is so constructed as to avoid any substantial interference with the surgeons and nurses, and is so simple in structure as to be easily sterilized before use to avoid contamination of the operating area. Further, the camera preferably requires no lens or shutter adjustments, to thereby greatly simplify the photographic procedure, and yet can be easily and quickly positioned to focus on any of various different levels above the operating table.

To achieve these results, I provide a unique structure which projects from the camera and carries a positioning unit adapted to engage a table or other support against which the person or other object to be photographed rests. The structure projecting from the camera also carries a focus indicator element, which is spaced a controllable distance from the table or support by the positioning unit, and which visually indicates to a user a plane in which the region to be photographed may be located for proper focusing on the film. An adjustable connection between the positioning unit and the structure which projects from the camera enables relative adjustment of these parts in a unique manner permitting controlled adjustment of the spacing of the focus indicator and its critical plane from the table or support, to thus permit precisely focused photographing of the subject at any desired and convenient level.

Since the focus indicator and camera are always maintained in fixed relative positions, and are shiftable in unison relative to the positioning unit and support, the indicator is always maintained the proper critical focusing distance from the camera, its lens, and the film plane in the camera, regardless of the distance that the object plane is spaced from the table or support. The indicator element may be elongated to extend generally transversely of the camera axis at the indicated spacing from the support, and may be of a length to further visually indicate the exact size of the area which will be photographed by the camera in any particular setting. Preferably, the indicator is mounted to swing or pivot from this transversely extending active position to a retracted position of extension alongside and parallel to a main portion of the structure by which it is connected to the camera.

BRIEF DESCRIPTION OF THE DRAWING

The above and other features and objects of the invention will be better understood from the following detailed description of the typical embodiment illustrated in the accompanying drawing, in which:

FIG. 1 is a side view of an operating table on which camera equipment embodying the invention is being utilized;

FIG. 2 is an enlarged transverse vertical section taken essentially on line 2—2 of FIG. 1;

FIG. 3 is a greatly enlarged vertical section showing a portion of the camera support assembly, and taken primarily on line 3—3 of FIG. 1;

FIG. 4 is a view taken on line 4—4 of FIG. 3;

FIG. 5 is a perspective view showing the attachment of the present invention removed from the camera and its connected column and with the focus indicator bar pivoted to its inactive position; and FIG. 6 is a view similar to FIG. 1 but showing the camera repositioned for photographing the legs of a patient.

DESCRIPTION OF THE PREFERRED EMBODIMENT

In FIG. 1, I have illustrated generally at 10 an operating table having an upwardly facing horizontal surface 12 on which the patient represented at 13 lies during an operation. Legs 14 support the table on the floor surface 15. The camera 19 is held by a photographer in the position of FIG. 1 while a picture of the patient is being taken, and is supported on the table at a precisely predeterminable level by a downwardly projecting assembly 18.

The camera 19 may be of a known preferably fixed-focus type, having a rigid hollow camera body 20 which carries a fixed focus lens 21 and shutter assembly 22 acting to focus an image on the plane of the film 23 carried at the top of the camera. In FIG. 1, the lens and camera are aimed directly downwardly along a vertical axis 11, and the film is of course disposed horizontally and transversely of axis 11. The purpose of utilizing a fixed-focus lens is to avoid the necessity for setting the focus of the lens before taking a picture, to thus simplify to the maximum extent the picture taking operation. Further, the lens desirably has a fixed aperture, and the shutter preferably has a predetermined fixed shutter time, to pass through the lens and to the film on each actuation of the shutter exactly the right amount of light for proper exposure of the film under the lighting conditions provided by the conventional light source or sources 24 above the table.

Assembly 18 may include a column 25 connected at its upper end 26 to one side of the camera and projecting downwardly toward the table at one side of the area viewed by the lens. The column in extending downwardly may have a first position 27 disposed parallel to axis 11, an intermediate portion 28 curving laterally away from the axis, and a lower portion 29 again extending parallel to the axis. This column may in other uses of the camera be employed for attaching the camera to a supporting base, as taught for example in my copending application Ser. No. 25,189 filed Apr. 2, 1970 on "Collapsible Camera Assembly."

Connected to the lower end of column 25, assembly 18 includes also an adjustable attachment 30, which is removably connected to column 25 when the device is to be utilized for surgical photography or other similar uses. This adjustable attachment includes a vertically extending positioning element 31, whose lower end 32 is supported by the upper surface 12 of the table. Element 31 may be formed of rigid sheet metal, preferably stainless steel for easy sterilization, and projects upwardly parallel to axis 11 but offset laterally therefrom and out of the area to be photographed.

Adjustably connected to positioning element 31, the attachment 30 includes a second rigid vertically elongated part or section 33, which may also be formed of stainless steel or other easily sterilized material, and which slidably contacts the inner surface of element 31 at 35. Two rivets or headed pins 36 and 37 have their shanks tightly retained in fixed positions within passages 38 and 39 in section 33, with those shanks also being slidably received and closely confined within a slot 40 in element 31, and with the heads 41 of these pins or rivets being received adjacent and in close proximity to the outer vertical planar surface 42 of element 31 to guide part 33 for only vertical adjusting movement relative to element 31. Part 33 is releasably retainable in any desired vertically adjusted setting by means of a thumbscrew 43, which is threadedly connected at 44 into part 33, and extends through slot 40, and has its head 45 tightenable against surface 42 of element 31.

At its upper end, part 33 has an opening 46 through which the shank 47 of a second thumbscrew 48 extends, for threaded connection at 49 into the lower axial portion 29 of the previously mentioned camera carrying column 25. A cylindrical pin 50 rigidly carried by and projecting horizontally from the lower portion of column 25 is receivable within an opening 51 in part 33 to coact with thumbscrew 48 in maintaining column 25 in fixed position relative to part 33, with part 33 forming in effect a vertical or axial continuation of portion 29 of the column. Opening 46 in part 33 has an upper reduced width portion 52 (FIG. 4) of a width to just receive the shank of thunbscrew 48, but not wide enough to pass the circular head 53 of the screw, so that the head may be tightened against flat outer surface 54 of part 33 to secure elements 25 and 33 rigidly together. At its lower end, slot 45 may have a widened portion dimensioned to pass head 53 of the thumbscrew through the slot in disassembling the parts, after the thumbscrew has first been loosened enough to release pin 50 from recess 51 and thereby permit relative vertical shifting movement of parts 25 and 33.

At its inner side, part 33 carries a focus indicator bar or element 55, which may take the form of an elongated rigid metal bar, desirably formed of stainless steel, as are elements 31, 33, and 25, and the various thumbscrews, connecting pins, and other parts of the camera positioning assembly. Bar 55 is connected pivotally to part 33 by another thumbscrew 56, which is threadedly secured to part 33 at 57, and has a cylindrical shank portion 58 received within a correspondingly dimensioned circular opening 59 in bar 55. This thumbscrew extends through the bar at its center, both longitudinally and transversely, so that in the horizontal position of FIGS. 1 and 4 the bar projects equal distances forwardly and rearwardly from elements 31 and 33, and for a total distance $d$ which corresponds exactly to the length in that direction of the area which will be imaged and photographed on the film in camera 19. When thumbscrew 56 is tightened, it retains bar 55 tightly in any desired set position such as the horizontally extending position of FIG. 4. When the thumbscrew 56 is released, the bar 55 is free to swing pivotally between the position of FIG. 4 in which it lies essentially within and defines a plane 60 disposed transversely of the lens and camera axis 11, and the retracted or inactive position of FIG. 5 in which the bar extends alongside and parallel to part 33 and parallel to axis 11.

The swinging movement of bar 55 is limited in the FIG. 4 transverse position by engagement of the lower edge 61 of the bar with the shank 62 of a pin 63 which is frictionally retained within an opening 64 in part 33. Similarly, the retracting swinging movement of bar 55 is limited in the FIG. 5 setting (shown in broken lines at 55 in FIG. 4) by engagement of a different portion of the same edge surface of bar 55 with the shank of the same pin 63 at 64, as will be apparent from FIG. 5. This pin and the dimensions of bar 55 are predetermined to enable the pin to thus act as a stop for the bar in two mutually perpendicular positions of the bar, in each of which the bar may be releasably locked by tightening of the head of screw 56 against the outer surface of the bar.

The transverse plane 60 in which focus indicator bar 55 lies in its active FIG. 5 position is spaced a predetermined known critical distance $t$ from the camera lens, and a known critical distance $m$ from the plane of film 23. The preferably fixed focal characteristics of the lens are such that it will project onto film 23 a focused image of any object lying in the plane 60. Further, the lens has a predetermined depth of field such that any object lying within a certain known distance above or beneath plane 60 will also be in focus. Preferably, more of this depth of field for which the lens is focused is beneath plane 60 than above it. For example, in one arrangement embodying the invention, the lens is capable of properly focusing on the film any any subject within 9 inches beneath plane 60, and within 3 inches above that plane.

To now describe the manner of use of the equipment, assume that it is desired to take a picture of a patient in the FIG. 1 position, and more particularly to photograph an operation being performed on a relatively high abdominal region. To set the device for this level, the user loosens screw 43, and adjusts part 33 and the attached camera and the focus indicator 55 slidably relative to element 31 so that when the lower end of element 31 is supported on the table the bar 55 will lie in a horizontal plane directly horizontally opposite the top of the abdominal region to be photographed (see the FIG. 1 position). With the set screw tightened in this setting, and with bar 55 retained in its FIG. 4 active position relative to part 33, the device is manually held in the FIG. 1 upright position on the table, and is so located longitudinally of the table that the region to be photographed is within the distance $d$ defined by the length of bar 55 and indicating the length of one side of the rectangular region which will be photographed in that position. The user then actuates the shutter to take the picture, and can quickly remove the camera from the picture taking region to avoid interference with the operation. For a very thin patient, the bar 55 may be adjusted downwardly to a location closer to the table. In either event, the bar should be positioned to be on the same level as the top of the region to be photographed, with the depth of field of the lens serving to maintain everything within a given distance beneath that level in focus. Thus, a person with little or no knowledge of photography is visually and very directly apprised by the height and length of the indicator bar exactly what area will be photographed in proper focus by the camera.

As will be apparent, the camera and its positioning assembly may also be positioned to photograph any other portion of the patient's body, as for instance, the head, arms, or the legs as shown in FIG. 6. In this event, the bar 55 and camera are merely adjusted to a level corresponding to the top of the legs or other regions to be photographed, and at a location laterally opposite those regions, and the desired properly focused picture will result. FIG. 6 also illustrates the manner in which indicator bar 55 serves an additional function of assuring directly vertical positioning of the camera support and the lens axis, since if the device is in an inclined position such as that shown in broken lines in FIG. 6, the non-horizontal position of bar 55 will be readily apparent to the user, and will assist in visually setting the camera in a proper upstanding position.

When it is desired to remove attachment 30 from the camera and column 25, this may be permitted by merely loosening thumbscrew 48 sufficiently to allow pin 50 to be slid out of opening 51, following which the column 25 may be moved downwardly to position thumbscrew 48 opposite the enlarged portion 53 of opening 45, and then be withdrawn through that enlarged portion of the opening. Indicator bar 55 may then be released by loosening thumbscrew 56 slightly and then swinging the bar through 90° from its FIG. 4 position to its FIG. 5 position in which the entire attachment 30 is collapsed to minimum dimension for easy handling. The bar may of course be locked in its retracted position by retightening of screw 65.

While a certain specific embodiment of the present invention has been disclosed as typical, the invention is of course not limited to this particular form, for rather is applicable broadly to all such variations as fall within the scope of the appended claims.

I claim:

1. Apparatus comprising a camera to be directed along a predetermined axis toward, and to photograph, an object which rests against a support and projects therefrom toward the camera, said camera having lens means directed along said axis toward said object and adapted to form an image thereof on film carried by the camera, a structure connected to said camera and projecting therefrom in a direction generally toward said object, a focus indicator carried by said structure and extending generally transversely of said axis at a location offset therefrom and positioned to indicate to a user a transverse plane in which a portion of said object to be photographed is properly positioned to be focused on said film by said lens means, a positioning unit projecting beyond said focus indicator in a direction away from said camera and toward said support and engageable with the support in a relation locating said focus indicator and said plane represented thereby in spaced relation to said support, and an adjustable connection attaching said positioning unit to said structure and indicator for adjusting movement relative to said structure and indicator and said plane in a direction toward and away from the camera to vary the spacing of said focus indicator and the plane from said support, said structure including a column attached to the camera and projecting therefrom, and a part carried by said column and projecting therefrom and connected to said indicator and said positioning unit, there being a detachable connection between portions of said column and said part and including a fastener carried by one of said portions and engageable in retaining relation with the other of said portions, and interfitting pin and recess locating means on said portions at a location offset from said fastener, said fastener having a threaded shank connected to one of said portions and extending through a slot in the other portion and having an enlarged head at an outer side of said other portion, said slot having a region narrower than said head and in which said shank is received when said pin and recess means are in engagement, and having an enlarged region large enough to pass said head and offset from said narrower region.

2. Apparatus comprising a camera to be directed along a predetermined axis toward, and to photograph, an object which rests against a support and projects therefrom toward the camera, said camera having lens means directed along said axis toward said object and adapted to form an image thereof on film carried by the camera, a structure connected to said camera and projecting therefrom in a direction generally toward said object, a focus indicator carried by said structure and extending generally transversely of said axis at a location offset therefrom and positioned to indicate to a user a transverse plane in which a portion of said object to be photographed is properly positioned to be focused on said film by said lens means, a positioning unit projecting beyond said focus indicator in a direction away from said camera and toward said support and engageable with the support in a relation locating said focus indicator and said plane represented thereby in spaced relation to said support, and an adjustable connection attaching said positioning unit to said structure and indicator for adjusting movement relative to said structure and indicator and said plane in a direction toward and away from the camera to vary the spacing of said focus indicator and the plane from said support, said structure including an elongated part extending generally parallel to said axis but offset therefrom, said focus indicator being elongated and connected to said part at a location intermediate the ends of said focus indicator and projecting in opposite directions from said part generally transversely thereof, there being a pivotal connection mounting said focus indicator to said part for pivotal movement relative thereto between a generally transverse active position and a retracted position of extension essentially parallel to and alongside said part, said positioning unit being elongated and extending generally parallel to and alongside said part, one of said part and positioning unit containing an elongated slot and the other having pin eans slidably received in said slot to form a sliding connection therebetween, there being a fastener fo releasably retaining said positioning unit in any desired adjusted position relative to said part, said focus indicator having a transverse dimension corresponding to and indicating one dimension of the area which will be photographed by said camera.

3. Apparatus as recited in claim 2, in which said structure includes a column attached to said camera and projecting therefrom and flaring away from said axis, and a detachable connection between said column and said part.

4. Apparatus as recited in claim 3, including a pin attached to said part and positioned for engagement with said focus indicator in said active position and said inactive position in a relation limiting the pivotal movement of said focus indicator in both of said positions.

5. For use with a camera to be directed along a predetermined axis toward, and to photograph, an object which rests against a support and projects therefrom toward the camera, said camera having lens means directed along said axis toward said object and adapted to form an image thereof on film carried by the camera: an attachment comprising a structure adapted to be connected to said camera and project therefrom in a direction generally toward said object, a focus indicator carried by said structure and extending generally transversely of said axis at a location offset therefrom and positioned to indicate to a user a transverse plane in which a portion of said object to be photographed is properly positioned to be focused on said film by said lens means, a positioning unit projecting beyond said focus indicator in a direction away from said camera and toward said support and engageable with the support in a relation locating said focus indicator and said plane represented thereby in spaced relation to said support, and an adjustable connection attaching said positioning unit to said structure and indicator for adjusting movement relative to said structure and indicator and said plane in a direction toward and away from the camera to vary the spacing of said focus indicator and the plane from said support, said structure including a column adapted to be attached to the camera and to project therefrom, and a part carried by said column and projecting therefrom, and connected to said indicator and said positioning unit, there being a detachable connection between portions of said column and said part and including a fastener carried by one of said portions and engageable in retaining relation with the other of said portions, and interfitting pin and recess locating means on said portions at a location offset from said fastener.

6. For use with a camera to be directed along a predetermined axis toward, and to photograph, an object which rests against a support and projects therefrom toward the camera, said camera having lens means directed along said axis toward said object and adapted to form an image thereof on film carried by the camera: an attachment comprising a structure adapted to be connected to said camera and project therefrom in a direction generally toward said object, a focus indicator carried by said structure and extending generally transversely of said axis at a location offset therefrom and positioned to indicate to a user a transverse plane in which a portion of said object to be photographed is properly positioned to be focused on said film by said lens means, a positioning unit projecting beyond said focus indicator in a direction away from said camera and toward said support and engageable with the support in a relation locating said focus indicator and said plane represented thereby in spaced relation to said support, and an adjustable connection attaching said positioning unit to said structure and indicator for adjusting movement relative to said structure and indicator and said plane in a direction toward and away from the camera to vary the spacing of said focus indicator and the plane from said support, said structure including a column adapted to be attached to the camera and to project therefrom and connected to said indicator and said positioning unit, there being a detachable connection between portions of said column and said part and including a fastener carried by one of said portions and engageable in retaining relation with the other of said portions, and interfitting pin and recess locating means on said portions at a location offset from said fastener, said fastener having a threaded shank connected to one of said portions and extending through a slot in the other portion and having an enlarged head at an outer side of said other portion, said slot having a region narrower than said head and in which said shank is received when said pin and recess means are in engagement, and having an enlarged region large enough to pass said head and offset from said narrower region.

7. For use with a camera to be directed along a predetermined axis toward, and to photograph, an object which rests against a support and projects therefrom toward the camera, said camera having lens means directed along said axis toward said object and adapted to form an image thereof on film carried by the camera: an attachment comprising a structure adapted to be connected to said camera and project therefrom in a direction generally toward said object, a focus indicator carried by said structure and extending generally transversely of said axis at a location offset therefrom and positioned to indicate to a user a transverse plane in which a portion of said object to be photographed is properly positioned to be focused on said film by said lens means, a positioning unit projecting beyond said focus indicator in a direction away from said camera and toward said support and engageable with the support in a relation locating said focus indicator and said plane represented thereby in spaced relation to said support, and an adjustable connection attaching said positioning unit to said structure and indicator for adjusting movement relative to said structure and indicator and said plane in a direction toward and away from the camera to vary the spacing of said focus indicator and the plane from said support, said structure including an elongated part adapted to extend generally parallel to said axis at a location offset therefrom, said focus indicator being elongated and connected to said part at a location intermediate the ends of said focus indicator and projecting in opposite directions from said part generally transversely thereof, there being a pivotal connection mounting said focus indicator to said part for pivotal movement relative thereto between a generally transverse active position and a retracted position of extension essentially parallel to and alongside said part, said positioning unit being elongated and extending generally parallel to and alongside said part, one of said part and positioning unit containing an elongated slot and the other having pin means slidably received in said slot to form a sliding connection therebetween, there being a fastener for releasably retaining said positioning unit in any desired adjusted position relative to said part, said focus indicator having a transverse dimension corresponding to and indicating one dimension of the area which will be photographed by said camera.

8. An attachment as recited in claim 7, including a pin attached to said part and positioned for engagement with said focus indicator in said active position and said inactive position in a relation limiting the pivotal movement of said focus indicator in both of said positions.

* * * * *